United States Patent [19]

Cajigas

[11] Patent Number: 4,956,185
[45] Date of Patent: Sep. 11, 1990

[54] INSTANT YOGURT COMPOSITION AND PROCESS

[75] Inventor: Stanley Cajigas, Toms River, N.J.
[73] Assignee: Milpak Inc., Pine Brook, N.J.
[21] Appl. No.: 344,361
[22] Filed: Apr. 26, 1989
[51] Int. Cl.⁵ .............................................. A23C 9/13
[52] U.S. Cl. ...................................... 426/43; 426/61; 426/583
[58] Field of Search ....................... 426/43, 61, 34, 41, 426/583, 580, 573, 576

[56] References Cited

U.S. PATENT DOCUMENTS

| | | | |
|---|---|---|---|
| 4,110,476 | 8/1978 | Rhodes | 426/41 |
| 4,289,788 | 9/1981 | Cajigas | 426/61 |
| 4,289,789 | 9/1981 | Cajigas | 426/61 |
| 4,624,853 | 11/1986 | Rudin | 426/61 |

*Primary Examiner*—Marianne Cintins
*Attorney, Agent, or Firm*—Hopgood, Calimafde Kalil, Blaustein & Judlowe

[57] ABSTRACT

This invention provides an instant, dry powdered yogurt formulation which can be reconstituted into either a yogurt meal or a yogurt drink, and a process for making same. The formulation of this invention includes a combination of xanthan gum and locust bean gum. This combination is important in making the formulation suitable to produce either a high quality meal or drink. A Lactobacillus culture, whey, and dehydrated yogurt powder are also included in the formulation. A process for preparing the formulation is described.

8 Claims, No Drawings

INSTANT YOGURT COMPOSITION AND PROCESS

BACKGROUND OF THE INVENTION

This invention relates to a food product, and more particularly to a dry yogurt product, and a process for preparing same. The dry product of this invention may be reconstituted to form either a liquid or a semi-solid food by the addition of a liquid such as milk.

Yogurt is a form of fermented milk which has been curdled to a smooth, creamy, or custard-like consistency. Natural yogurt is produced by the fermentation of lactic acid-producing organisms, e.g. Lactobacillus bulgaricus or Lactobacillus acidophilus. Generally, the microorganism is added to milk and then incubated until the desired amount of fermentation has occurred. The fermentation process lowers the pH of the milk and causes it to curdle. The product thus produced is ordinarily chilled to inhibit undesirable microbial action and preserve the product in the desired condition. It is in this hydrated form that yogurt is commonly sold.

A process for preparing a liquid yogurt which may be frozen is disclosed in U.S. Pat. No. 4,110,476. However, it is convenient to have an instant yogurt which may be preserved for long periods of time, and which may be reconstituted by the average consumer when it is to be consumed. U.S. Pat. No. 1,289,789 refers to instant yogurt drink formulations that are reconstituted with milk. Similarly, U.S. Pat. No. 4,289,788 refers to instant yogurt meal (i.e. semisolid) compositions that are reconstituted with milk. U.S. Pat. No. 4,624,853 discloses another type of instant yogurt-like product.

The texture of a yogurt is an important factor in determining its consumer acceptability. Yogurt should be free of lumps or curds and exhibit a smooth, custard-like consistency. A high quality yogurt is one of good texture which is low in fat and which includes effective amounts of active culture, as well as protein, calcium and other useful nutrients.

High quality hydrated yogurt products are sold commercially. It is also possible for consumers to produce high quality yogurt at home, although this requires a fair amount of time, effort and skill. However, all hydrated yogurt products have a quite limited life, even when refrigerated. Therefore, yogurt must be purchased or made close to the time of consumption to avoid spoilage.

An instant yogurt product provides the benefits of long shelf life and convenient preparation and storage. It has not been possible to produce an instant high quality yogurt product which can be conveniently reconstituted into either a yogurt drink or a yogurt meal.

SUMMARY OF THE INVENTION

In one aspect, the present invention provides an instant powdered composition. This composition comprises a mixture of essential ingredients, including deactivated yogurt powder, Lactobacillus culture, a mixture of xanthan gum and locust bean gum wherein both gums have a mesh size of about twenty to about four hundred, and a whey, and may optionally include fibers, bran or purified cellulose. The inventive composition can also include sweeteners (artificial or natural), flavoring agents, and coloring agents.

In another aspect, the present invention provides a process for preparing the above identified instant powdered composition. This process comprises mixing the above identified ingredients to form a free flowing, dry powdered composition.

An object of this invention is to provide a packaged instant yogurt preparation that requires no refrigeration, has a prolonged shelf life, and can be prepared as either a yogurt drink or a yogurt meal.

Another object of the present invention is to provide a process for preparing an instant yogurt preparation that can be reconstituted to form either a yogurt drink or a yogurt meal.

A further object of the present invention is to provide an instant yogurt formulation having high quality, high nutritional value, and fiber.

Other objects and advantages of the present invention will become apparent from the following description of the preferred embodiments of the present invention.

DETAILED DESCRIPTION OF THE PREFERRED EMBODIMENTS

The present invention comprises an instant powdered composition that will form a yogurt meal, or a liquid yogurt drink, when mixed with liquid milk or reconstituted powdered milk, and a process for preparing said composition.

The dry powdered composition of this invention is suitably mixed with milk in the approximate proportion of 18 to 30 grams of powder to six ounces of milk to form a yogurt meal; when eight ounces of milk are added to about 15 to 30 grams of the instant yogurt formulation, a yogurt drink is created. The optimal proportion needed to create a drink or a meal will vary depending upon the particular embodiment, and the preference of the consumer. This invention is not limited to use with any particular type of milk; any milk or milk substitute may be used, such as whole milk, skim or non-fat milk, non-dairy creamers, powdered milk and the like. Of course, where powdered milk is used it must be reconstituted with the appropriate amount of water, either before or after mixing with the instant yogurt powder, to form the requisite quantity of milk. Thus, the fat content of the milk may vary from 0% up to roughly 4% (whole milk), or even higher. The fat content of the reconstituted yogurt product will, of course, depend upon the fat content of the milk used to create it. If non-fat milk is used, a lower-fat yogurt is produced.

Yogurt flavor is imparted to the composition of the present invention by Lactobacillus culture and deactivated yogurt powder. Yogurt powder is dehydrated and may be of the type produced and sold by Beatrice Foods, National Dairy or other large suppliers of yogurt powder, such as creamery products, or it may be yogurt powder manufactured directly for use in production according to standard evaporation and drying techniques. While yogurt powder is made from natural yogurt containing an active culture, the processing of natural yogurt with heat to remove all moisture acts to destroy the yogurt culture. Hence, yogurt powder is in the deactivated state. The yogurt powder may be dried by freeze drying, spray drying, roller drying, or any other commercial drying technique. The preferred yogurt powder is spray dried. The amount of dehydrated yogurt in the invention composition may vary widely but generally is from about 10% to about 45% by weight of the composition. Preferably, the amount of yogurt powder is from about 20% to about 30% of the total dry powdered composition. Most preferably, the yogurt powder comprises from about 35% to about 39% of the composition.

Dry Lactobacillus culture is also commercially available. It is used as a culture for the production of natural yogurt. For purposes of inclusion in a dried composition in accordance with the invention, it is preferable to use a dry culture in which the bacilli are in the dormant state and are activated when water (or milk) is added to the preparation; this culture must be sufficiently stable for storage at room temperature. Stabilized, dried cultures of lactic acid-producing bacteria of the type described in U.S. Pat. No. 3,837,397 (the disclosure of which is hereby incorporated by reference) may be used for the present invention. Lactobacillus culture serves, when ingested, to promote the growth of intestinal bacteria which are beneficial to the intestinal flora of the small intestine and which help promote food digestion and absorption across the small intestine.

The amount of Lactobacillus culture used in the present inventive composition may vary widely, although it is generally from about 0.001% to about 1.0%. Typically, the lower portion of this range of concentrations is used, preferably from about 0.001% to about 0.01%.

The composition of the present invention comprises whey. Whey is an excellent source of high value protein. The whey used in the present invention may be either a sweet whey or an acid whey, depending on the flavor characteristics desired in the final product. A sweet whey is generally used to make a non-fruit flavored yogurt. An acid whey (i.e. a whey containing lactic, citric, malic or tartaric acid, or the like) is generally used to make a fruit-flavored yogurt product, to produce a more sour taste. Acid wheys affect the gel set characteristics of the yogurt product, so higher concentrations of xanthan gum and locust bean gum are generally used with an acid whey to counter this effect. The dry yogurt composition of the present invention generally comprises approximately 10–30% by weight of a whey, and preferably comprises about 15–22% whey.

For fruit-flavored compositions, a particularly preferred whey is a mixture of acid whey and citric acid. This mixture is particularly preferred because it combines the advantages of acid whey with the fact that the total amount of acid in the mixture may be regulated using citric acid. The amount of food acidulant that may be used in the dry composition of the present invention should be sufficient to adjust the pH of the solution formed when the composition is combined with water to about 3.5 to 4.5. If the pH is lower than about 3.5, the product may be coarse in texture due to an acid-induced protein reaction.

A hydrocolloid gum must be used in the inventive composition. The hydrocolloid gum is preferably a mixture of xanthan gum and locust bean gum. This combination of gums accounts for the ability of the inventive composition to be reconstituted as either a yogurt drink or a yogurt meal. The gums of the present invention will have a mesh size of about 20 to about 400 per cm. The gums each have a preferred mesh size of about two hundred to four hundred per cm., most preferably about three hundred, because these fine mesh gums produce a fine texture product. Lower mesh sizes, e.g. 20–50, may be used when a higher texture is desirable.

The total concentration of both gums is from about 0.1% to about 20% by weight of the total composition. Preferably, the total concentration of these gums is from about 4% to about 11%. Most preferably, the total weight of gums in the instant formulation is approximately 9%, with approximately half the weight being contributed by locust bean gum and half by xanthan gum.

Other ingredients may also be added to the composition of the present invention. For example a sweetener, either caloric or noncaloric, may be added. Such caloric sweeteners include fructose, sucrose and dextrose, although other sugars, such as corn syrup solids, lactose, etc., may be used. Such sugars may be employed singularly or in combination. Moreover, artificial sweeteners that are slightly caloric or noncaloric, such as, for example, edible saccharine salts, dipeptide units such as aspartame and the like, may be included in the dry mix to replace all or part of the sugar. Other artificial sweeteners, as they become approved for food use, may be used in the inventive composition. A preferred artificial sweetener is an aspartame mixture at a concentration of approximately 5%. This mixture comprises about one part aspartame and ten parts of a dispersent, e.g., whey powder. The amount of sweetener used may vary widely, but generally approximately 1–20% by weight of the yogurt formulation is sweetener. Suitably, 1–10% of the formulation may be sweetener. Pure aspartame may be used in an amount of about 0.1% to about 1.5% of the yogurt formulation.

A fiber source in addition to the fiber provided by the xanthan gum and the locust bean gum is often utilized in the inventive compositions. A preferred insoluble fiber source in bran, preferably rice bran, oat bran, or wheat bran. Bran, or another suitable fiber source, or combination of sources, can comprise up to about 10% by weight of the composition. Suitably, bran is added to the composition, in a range of from about 0.3% to about 4.0% by weight. Preferably, rice bran constitutes approximately 1.0% of the total composition. Another fiber source suitable for use in the present invention is purified cellulose, including microcrystalline cellulose. The fiber content of the composition affects its texture, and thus may affect the mesh size chosen for the gums. If the fiber content is relatively low, a lower number mesh size will be needed to provide more texture to the product.

The nutritional aspects of the composition can be improved by the addition of a protein source. Suitably, this ingredient may comprise up to about 20% of the composition. Preferably, caseinate, such as sodium, potassium, or calcium caseinate, is added at about 10% to about 20% by weight of the total composition. Preferably, calcium caseinate constitutes approximately 15% of the composition. Whey protein concentrate can also be used as an added source of protein, either alone or in combination with other proteins.

An emulsifier or dispersing agent, e.g. lecithin, may be used in the inventive composition. Lecithin is the preferred emulsifier because it comprises a phospholipid complex which approximates the phospholipids naturally occurring in milk. Other emulsifiers, such as mono- and diglycerides and combinations thereof, citrate salts, or phosphate salts, may be used. The dispersing agent acts to disperse the powder particles in milk or water when the instant formulation is reconstituted. However, an emulsifier is not essential if the composition is prepared by spray drying. The amount of dispensing agent used in the present invention is generally about 0.1 to 10%, although amounts outside this range may be used. Preferably about 0.3 to 1.5% by weight is used. Suitably about 0.5% is used.

Flavoring agents may be employed in the composition of the present invention. A flavoring agent may be natural or artificial. Dehydrated fruits, such as apple flavored bits, may also be employed. When a natural fruit flavoring agent is employed, the preferred sweetener is fructose because fructose brings out the natural fruit flavors to a greater extent than do other sweeteners. The amount of flavoring agent may vary widely, but generally an amount of from about 0.1% to about 5%, typically from about 0.3% to about 3.0%, and preferably from about 0.5% to about 1.0% by weight of the total composition may comprise flavoring agents.

Coloring agents may also be used in the present invention. The coloring agent may be any acceptable coloring ingredient appropriate to the flavoring agents and approved for food use. For example, in the case of strawberry flavor, the appropriate coloring agent may be FD&C Red 40. The amount of coloring agent may vary widely, but an amount of generally from about 0.001% to about 1.0%, typically from about 0.2% to about 0.5%, and preferably from about 0.06% to about 0.1% by weight of the total composition may be used, depending upon the potency of the agent and the intensity of the color desired. Natural colors, e.g., beet color, may be used, alone or in combination with other coloring agents.

The locust bean gum and xanthum gum of the present invention comprise a gelling system which thickens and produces a custardlike texture in the product. These inventive compositions are fully capable of setting to produce a yogurt meal of high quality, yet may also be employed to produce a high quality yogurt drink. Other gel systems are known in the art, e.g. those using instant starches, carrageenian or other types of gums, but the prior art systems are not suitable substitutes for the gums in the present invention. Alginates may be used as a setting gel if calcium levels are carefully controlled, and gums such as agar may be used if specially treated, e.g. by pre-cooking and grinding. However, the gums of the present invention provide all the advantages disclosed herein without special calcium salts or phosphate salts to set the gel and without special treatment. When used in the proportions and mesh sizes stated above, these gums provide a system which is cold milk or water active without special instantizing.

The composition of the present invention may be prepared by dry blending the individual ingredients. Any temperature or pressure for the dry blending step may be employed, but essentially ambient temperatures and pressures are preferred.

The ingredients of the composition of the present invention may be admixed by any apparatus well known to those skilled in the art. Although any means of admixing known to those skilled in this art may be employed, such as dry blending or spray drying, it is preferred that the ingredients of the composition of the present invention by admixed by spray drying using typical spray drying apparatus such as a Bowen spray dryer or a Nero dryer. Spray drying is preferred over, for example, dry blending because some of the ingredients of the composition are in the liquid state. To be dry blended, the ingredients must first be dried, whereas with spray drying, the blending and drying operations are carried out in a single operation. Spray drying is thus more economical than dry blending for the present invention.

The process for preparing the composition of the present invention may be conducted in a continuous, semicontinuous or batch manner. The composition of the present invention is preferably packaged in a hermetically sealed envelope, such as a plastic foil laminated envelope which is heat sealed to exclude air and moisture. Once packaged in hermetically sealed envelope, the preparation has an indefinite shelf life at ordinary room temperatures.

A consumer may use the instant yogurt compositions by breaking the package seal and pouring the powder into a container to which milk and/or water is added. A yogurt drink may be created, for example, by adding about 22 grams of powder to eight ounces of milk. The mixing can occur in a blender or by shaking. Once reconstituted, the refrigerated shelf life of the yogurt drink is approximately equivalent to that of refrigerated natural yogurt. Yogurt meal is typically prepared by mixing approximately 30 grams of the dry composition with approximately 6 ounces of milk. The mixture is shaken and allowed to set for at least 3 minutes.

The present invention is further illustrated by the following examples. All parts and percentages in the examples as well as in the specification and the claims are expressed on a weight basis unless otherwise stated.

EXAMPLE I

To make a chocolate dessert yogurt drink, the following ingredients were dry blended at room temperature in a J.B. Day Dry Blender:

| Ingredients | % by Weight |
| --- | --- |
| Nonfat dried milk yogurt powder | 35.88 |
| Sweet Whey | 18.42 |
| Lactobacillus culture | 0.0016 |
| Xanthan gum (mesh 200) | 3.19 |
| Locust bean gum (mesh 200) | 3.19 |
| Rice bran | 1.79 |
| Calcium caseinate | 13.95 |
| Purified cellulose | 3.99 |
| Cocoa | 11.96 |
| Chocolate flavor | 1.71 |
| Aspartame (1 to 10 mixture with whey powder) | 5.58 |
| Sodium aluminum silicate | 0.33 |

The above composition may be reconstituted by taking approximately 15 to 30 grams of the dry powder and adding it to approximately 8 ounces of cold milk stirring in a blender and is then ready for consumption. A natural tasting yogurt drink results.

EXAMPLE II

A strawberry yogurt formulation was created by mixing the following ingredients using a Bowen spray drying apparatus:

| Ingredients | % by Weight |
| --- | --- |
| Natural dry milk yogurt powder | 38.98 |
| Lactobacillus culture | 0.0013 |
| Sweet Whey | 18.34 |
| Xanthum gum (mesh 300) | 4.48 |
| Locust bean gum (mesh 300) | 4.48 |
| Calcium caseinate | 15.98 |
| Acid Whey | 4.98 |
| Lecithin | 1.00 |
| Purified cellulose | 1.00 |
| Strawberry flavor | 1.29 |
| Rice bran fiber | 1.00 |
| Aspartame (1 to 10 mixture with whey powder) | 4.98 |
| Citric acid | 1.33 |
| Freeze dried strawberry | 1.66 |
| Sodium aluminum silicate | 0.40 |

| Ingredients | % by Weight |
| --- | --- |
| FD&C Red 40 | 0.10 |

The above composition may be reconstituted by mixing approximately 15 to 30 grams of the composition with approximately 8 ounces of milk (preferably nonfat milk). The mixture is vigorously stirred in a blender and then is ready for consumption. A natural tasting yogurt drink results.

From the foregoing, it will be appreciated that, although specific embodiments of the invention have been described herein for purposes of illustration, various modifications may be made without deviation from the spirit and scope of the present invention.

I claim:

1. A powdered yogurt formulation, which can be reconstituted into either a yogurt meal or a yogurt liquid drink, consisting essentially of:
   about 10–45% by weight of dehydrated yogurt powder;
   about 0.001–1.0% by weight of a Lactobacillus culture;
   about 10–30% by weight of a whey; and
   about 0.1–20% by weight of a mixture of locust bean gum and xanthan gum.

2. A powdered yogurt formulation according to claim 1 wherein said gums have a mesh size of about 20 to about 400 per cm.

3. A powdered yogurt formulation according to claim 2 wherein said mesh size is about 200 to about 400.

4. A powdered yogurt formulation according to claim 2 wherein said gums are used in approximately equal amounts by weight.

5. A powdered yogurt formulation according to claim 1 wherein said culture is either Lactobacillus bulgaricus or Lactobacillus acidophilus.

6. A powdered yogurt composition consisting essentially of:
   about 35–39% by weight of a dehydrated yogurt powder;
   about 15–22% whey;
   about 4–11% of a mixture comprising approximately equal weights of xanthan gum and locust bean gum, said gums having a mesh size of about 300; and,
   about 0.001–1.0% of Lactobacillus balgaricus.

7. A process for preparing a powdered yogurt composition which can be reconstituted into either a yogurt meal or a liquid yogurt drink, said process consisting essentially of admixing the following ingredients:
   about 10–45% by weight of dehydrated yogurt powder;
   about 0.001–1.0% by weight of a Lactobacillus culture;
   about 10–30% by weight of a whey; and
   about 0.1–20% by weight of a mixture of locust bean gum and xanthan gum, by spray drying.

8. A process for preparing a powdered yogurt composition when can be reconstituted into either a yogurt mean or a liquid yogurt drink, said process consisting essentially of admixing the following ingredients:
   about 10–45% by weight of dehydrated yogurt powder;
   about 0.001–1.0% by weight of a Lactobacillus culture;
   about 10–30% by weight of a whey; and
   about 0.1–20% by weight of a mixture of locust bean gum and xanthan gum, by dry blending at ambient temperatures.

* * * * *